Dec. 12, 1950  C. W. LANTER  2,533,268
COMBINED BLOWER AND VACUUM CLEANER
Filed July 24, 1947  3 Sheets-Sheet 2
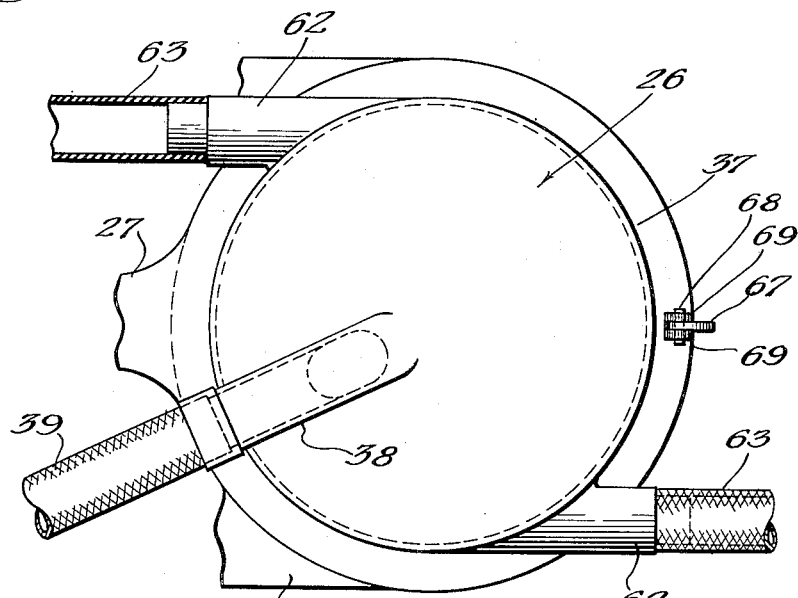
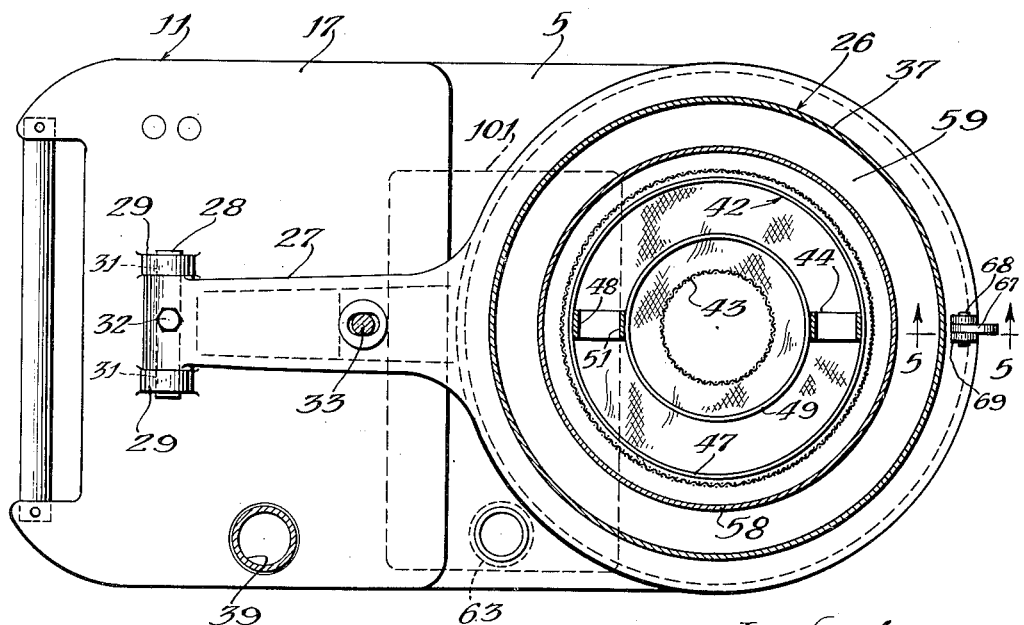
Inventor:
Clarence W. Lanter
By Lee J. Gary
Attorney

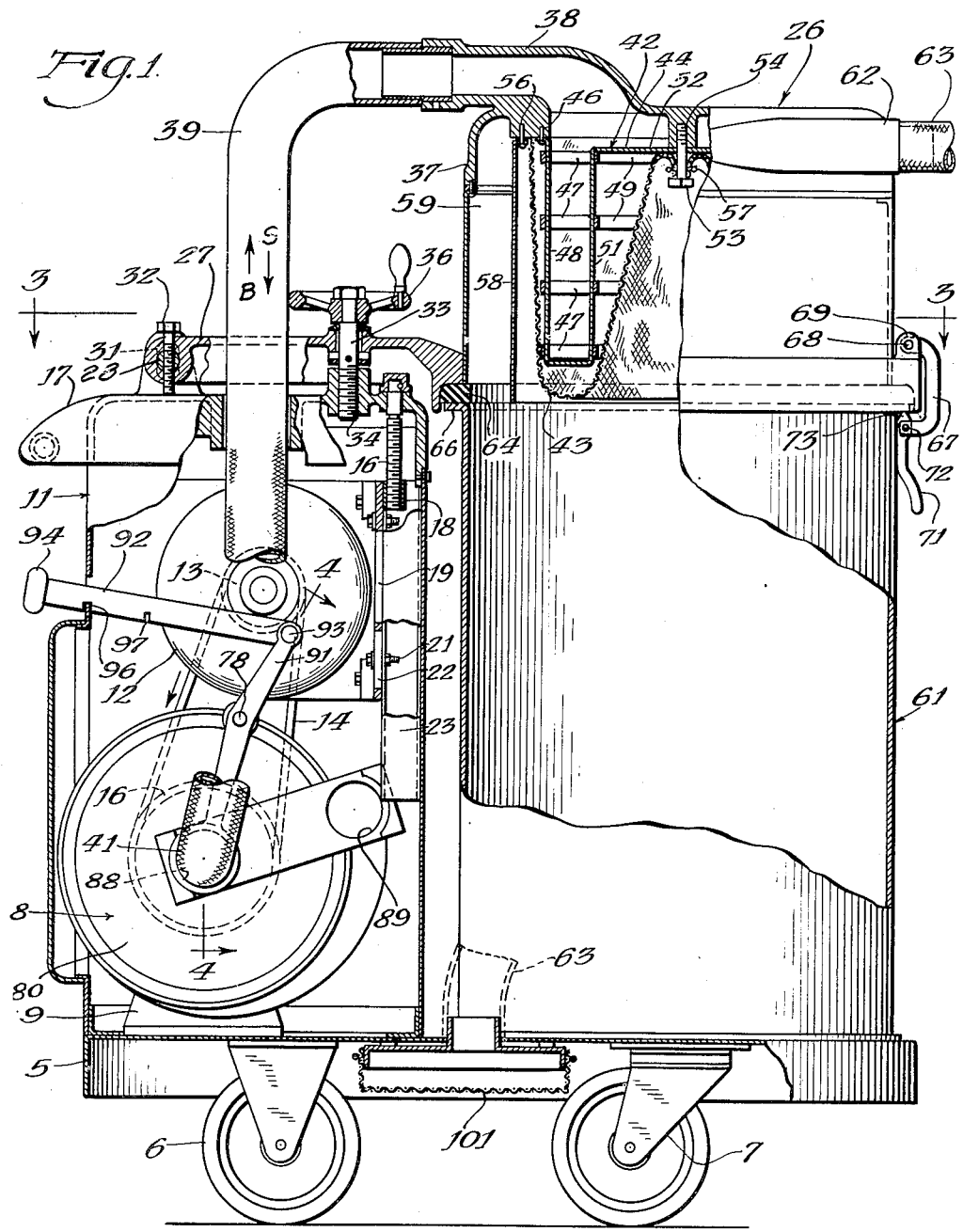

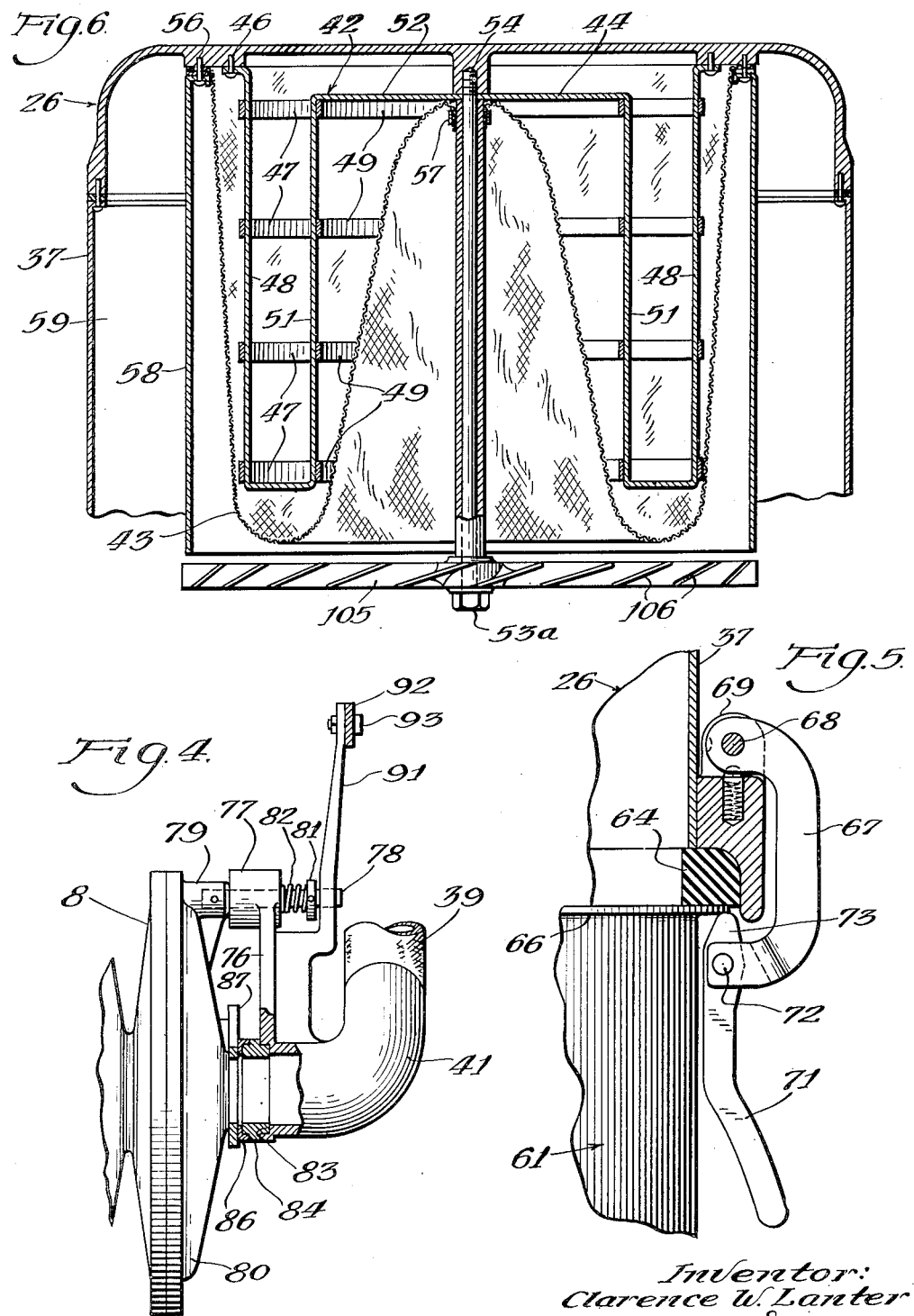

Patented Dec. 12, 1950

2,533,268

UNITED STATES PATENT OFFICE 2,533,268

COMBINED BLOWER AND VACUUM CLEANER

Clarence W. Lanter, Bartlett, Ill., assignor to Breuer Electric Mfg. Company, Chicago, Ill., a corporation of Illinois Application July 24, 1947, Serial No. 763,376

7 Claims. (Cl. 183—35)

1

This invention relates to improvements in combined blowers and vacuum cleaners, and is more particularly concerned with the provision of an apparatus of this type designed for use in industries, such as cotton mills, in which it is necessary to collect large quantities of lint and dirt from the floors and machinery.

Briefly, the present invention comprises a portable carriage adapted to receive and support a relatively large cylindrical dirt receptacle having its upper end open to receive and be detachably connected to a filter head. One end of the filter head is adjustably mounted upon a casing employed to use a motor driven centrifugal fan having the usual axial air inlet and tangential air outlet. An air conduit extends from the filter head to the centrifugal fan, and means is provided for selectively engaging the air conduit with either the air inlet or the air outlet of the fan. When the air conduit is connected to the fan inlet, the apparatus serves as a vacuum cleaner to draw a stream of air and dirt into the interior of the dirt receptacle, the dirt being separated from the air stream by means of a cyclone action created within the filter head and dirt receptacle and then by means of a suitable filter provided in the filter head. When the air conduit is connected to the fan outlet, the apparatus serves as a blower to direct a stream of air through a suitable nozzle leading from the filter head.

After the apparatus has been employed as a vacuum cleaner in collecting lint and dirt from floors and machinery, the openings in the filter screen in the filter head become clogged. It is, therefore, an object of this invention to provide a simple means for suddenly reversing the flow of air through the filter screen and to thus cause the screen to be expanded with a snap action to dislodge the dirt particles from the filter screen apertures.

This invention contemplates the provision of a combined blower and vacuum cleaner embodying a filter head which may be mounted in operative position upon the open end of a cylindrical dirt container and may be adjustably positioned to accommodate receptacles of different heights.

This invention further contemplates the provision of a simple and inexpensive means for operating the apparatus as a blower or vacuum cleaner.

This invention embodies other novel features, details of construction and arrangement of parts which are hereinafter set forth in the specification and claims, and illustrated in the accompanying drawings wherein:

2

Fig. 1 is a side elevational view partly in section, illustrating a combined blower and vacuum cleaner embodying features of this invention.

Fig. 2 is a fragmentary top plan view showing a filter head.

Fig. 3 is a sectional view taken along the line 3—3 of Fig. 1.

Fig. 4 is a sectional view taken along the line 4—4 of Fig. 1 illustrating the means employed for moving an air conduit to either the air inlet or air outlet of a centrifugal fan.

Fig. 5 is a detail sectional view taken along the line 5—5 of Fig. 3, showing the means employed for detachably connecting one side of the filter head to the upper end of the dirt receptacle.

Fig. 6 illustrates a modified form of this invention in which a plurality of deflector blades are provided at the lower end of the filter head to deflect particles of dirt downwardly into the dirt receptacle.

Referring now to the drawings for a better understanding of this invention, the combined blower and vacuum cleaner is shown as comprising a carriage 5 supported on wheels 6 and casters 7. A centrifugal fan 8 is supported upon the carriage 5 by means of a bracket 9. A suitable housing 11 is provided on the carriage 5 to enclose the fan 8. An electric motor 12 is adjustably supported within the housing 11 and provided with a driving pulley 13 which acts through a belt 14 and a driven pulley 16 to drive the fan 8. The motor 12 is adapted to be adjusted vertically by means of an adjustment screw 16 journaled in the housing cover 17 and having its threaded end engaging an internally threaded sleeve 18 provided on the motor base 19. The motor is secured in adjusted position by means of bolts 21 which pass through slots 22 provided in the motor base and engage a guide bracket 23 provided on the housing 11.

A filter head 26 is provided with a supporting arm 27 which is adjustably connected to the cover 17 of the housing 11 by means of a pivot pin 28 mounted in bosses 29—29. The bosses 29—29 are formed with slots 31—31 to receive the ends of the pivot pin 28. An adjustment screw 32 is adjustably positioned in a threaded opening provided in the pivot pin 28 for engagement against the upper surface of the cover 17. An adjustment screw 33 is journaled for rotational and non-axial movement in the arm 27 and is threaded at its lower end for engagement in a threaded aperture 34 provided in the cover 17. The hand wheel 36 is keyed to the upper end of the adjustment screw 33.

The filter head 26 comprising an inverted cup-shaped housing 37 is secured to the arm 27 by any suitable means such as welding or riveting. An air outlet nozzle 38 leads outwardly through the upper end of the filter head 26 for engagement with one end of a flexible air conduit 39, which has its other end connected to an adjustable nozzle 41. A filter screen frame 42 is provided within the filter head 26 to hold a filter screen 43 in its extended position, as illustrated in Figs. 1 and 6. The filter screen frame 42 comprises a W-shaped cross bar 44 having the upper ends of its outer legs secured to the top of the filter head 26 by means of screws 46. A plurality of rings 47 are disposed in spaced parallel relation and have their diametrically opposed sides welded or otherwise secured to the outer legs 48 of the cross bar 44. A plurality of rings 49 are disposed in spaced parallel relation and have their diametrically opposed sides welded or otherwise secured to the inner legs 51 of the W-shaped cross bar 44. The central portion 52 of the W-shaped cross bar 44 is formed with an aperture to receive a cap screw 53 which is threaded at 54 into the top of the housing 37. The filter screen 43 is of a bag-type having its peripheral edge secured to the top of the housing 37 by means of cap screws 56. The center of the filter screen is formed with an aperture to receive the cap screw 53, and the portion of the filter screen defining the aperture is secured to the cap screw 53 by means of a suitable clamping ring 57. A tubular bag guard 58 is secured to the housing 37 by means of the cap screws 56 to define with the side wall of the housing 37 an annular downwardly extending passageway 59 leading to the interior of a dirt receptacle 61.

As illustrated in Figs. 1 and 2, the filter head 26 is provided with one or more tangentially disposed air inlet nozzles 62 to receive flexible air conduits 63 of the type commonly employed with vacuum cleaners for drawing dirt into the dirt receptacle. The tangentially disposed air inlet nozzles 62 are disposed to direct a stream of dirt and air into the upper end of the annular passage 59, and it will be noted that the air stream entering the annular passage 59 will be caused to move along a helical path to direct the dirt downwardly along the inner wall of the dirt receptacle 61. An annular recess is formed in the lower end of the housing 37 to receive a gasket 64 formed of rubber or other resilient material, the gasket 64 being disposed to engage and form an air-tight connection with an annular flange 66 formed on the upper end of the dirt receptacle 61. A C-clamp 67 is pivotally connected at its one end to the housing 37 by means of a pivot pin 68 mounted in bosses 69. A clamping arm 71 is pivotally connected at 72 to the lower end of the C-clamp 67 and is provided with a finger portion 73 for engagement against the underside of the annular flange 66.

The adjustable nozzle 41 is provided with a pivot arm 76 having a bearing portion 77 to receive a stud shaft 78. The stud shaft 78 is mounted at its one end in the boss 79 formed on the centrifugal fan casing 80. A collar 81 is secured on the stud shaft 78, and a compression spring 82 is interposed between the collar 81 and the bearing 77. An annular recess 83 is formed in the end of the adjustable nozzle 41 to receive an annular spacing member 84 formed of resilient rubber. An annular face plate 86 is provided on the annular spacing member 84 for engagement against a flat surface 87 provided on the fan casing 80. The fan casing 80 is provided with an axial air inlet 88 and tangential air outlet 89 leading through the flat surface 87. A lever arm 91 is provided on the adjustable nozzle 41 for engagement by an actuating rod 92. The inner end of the actuating rod is pivotally connected at 93 to the lever arm 91 and the outer end of the actuating rod is provided with a handle portion 94. Notches 96 and 97 are formed in the actuating rod 92 to receive and engage a wall of the housing 11. The notch 96 is provided to hold the adjustable nozzle 41 in registry with the axial air inlet opening 88 formed in the fan housing. The notch 97 in the actuating rod 92 is disposed to engage the wall of the housing 11 to hold the adjustable nozzle 41 in registry with the air outlet 89 formed in the fan housing 80.

During the operation of the apparatus to collect and discharge dirt and lint into the dirt receptacle 61, the adjustable nozzle 41 is held in registry with the axial air inlet opening 88 formed in the fan housing 80. Dirt and lint are drawn into the annular passage 59 of the filter head 26 through the flexible conduits 63. As illustrated in Figs. 1 and 2, the dirt laden air stream enters the annular passage 59 adjacent the upper end thereof and is caused to move downwardly along a helical path to drop the dirt into the container 61. The air and lighter particles of dirt are drawn upwardly against the filter screen 43 which acts to filter the lighter particles of dirt from the air stream. The air passing through the filter screen 43 is directed through the nozzle 38, conduit 39, adjustable nozzle 41, fan inlet 88, and discharged through the fan outlet 89.

During the operation of the apparatus as a vacuum cleaner, it is necessary at times to dislodge particles of dirt from the filter screen apertures. This is accomplished by moving the adjustable nozzle 41 into registry with the air outlet 89 of the centrifugal fan 8. The fan thus acts to direct a stream of air upwardly through the conduit 39 and cause the filter screen 43 to be snapped outwardly to dislodge lint or particles of dirt from the filter screen apertures. In performing the filter screen cleaning operation, a filter bag 101 may be attached to the outlet end of the conduit 63 if desired to receive any relatively fine particles of dirt which might be entrained in the air stream, otherwise some dirt might be discharged into the room through the conduit 63.

The apparatus shown and described is also particularly useful as a blower in removing lint from cotton mill machinery. It has heretofore been the practice in cotton mills to install air compressors, air storage tanks and conduits for use in blowing lint from machinery, but the compressed air usually contains a considerable amount of moisture and causes the machinery to rust. The present apparatus is changed from a vacuum cleaner to a blower apparatus by merely engaging the notch 97 of the actuating rod 92 in engagement with the wall of the housing 11, thus moving the adjustable nozzle 41 into registry with the air outlet 89 of the centrifugal fan 8. When the apparatus is employed as a blower, it is desirable that the dirt receptacle 61 should not completely be filled with dirt.

Fig. 6 in the drawings illustrates a modified form of this invention in which a dirt deflector 105 is disposed below the filter screen 43. The dirt deflector 105 is supported at the end of a cap screw 53a which is threaded into the upper end of the filter head 26 at 54. A plurality of radially disposed blades 106 are provided on the dirt deflector 105 to cause the heavier particles of dirt in the upwardly passing air stream to be deflected downwardly into the dirt receptacle 81. During the operation of the apparatus as a vacuum cleaner, it will be noted that the dirt laden air stream is directed along a helical path leading downwardly from the upper end of the filter head to the interior of the dirt receptacle, and is then caused to travel upwardly along a helical path to pass between the blades 106 of the dirt deflector 105. By disposing the blades 106 at a plane substantially normal to the direction of flow of the dirt laden air stream, it will be noted that the relatively heavy particles of dirt will strike against the underside of the blades and be deflected downwardly into the dirt receptacle.

While this invention has been shown in but two forms, it is obvious to those skilled in the art that it is not so limited but is susceptible of various changes and modifications without departing from the spirit and scope of the claimed invention.

I claim as my invention:

1. In a combined blower and vacuum cleaner, a dirt receptacle formed with an opening at its upper end, an inverted cup-shaped filter head detachably mounted upon and forming a cover for said dirt receptacle, said filter head being provided at its upper end with a tangentially disposed air inlet, said filter head being provided with an air outlet disposed adjacent the top center thereof, a filter frame mounted within said filter head, a flexible bag-type filter screen mounted over said filter frame and arranged to enclose the latter and to filter dirt from an air stream passing outwardly through said filter head air outlet, a centrifugal fan having an air inlet and an air outlet, an air conduit having its one end connected to said filter head air outlet and its other end in register with the air inlet of said centrifugal fan, and a tubular filter bag guard mounted within said filter head to form therewith an annular passage leading downwardly from said filter head air inlet to cause an inwardly flowing stream of air to move downwardly along a helical path from said filter head air inlet into said dirt receptacle, whereby dirt entrained in the air stream is directed toward the inner wall of the dirt receptacle.

2. In a combined blower and vacuum cleaner, a dirt receptacle formed with an opening at its upper end, an inverted cup-shaped filter head detachably mounted upon and forming a cover for said dirt receptacle, said filter head being provided at its upper end with a tangentially disposed air inlet, said filter head being provided with an air outlet disposed adjacent the top center thereof, a filter frame mounted within said filter head, a flexible bag-type filter screen mounted over said filter frame and arranged to enclose the latter and to filter dirt from an air stream passing outwardly through said filter head air outlet, a centrifugal fan having an air inlet and an air outlet, an air conduit having its one end connected to said filter head air outlet and its other end in registry with the air inlet of said centrifugal fan, and a tubular filter bag guard mounted within said filter head to form therewith an annular passage leading downwardly from said filter head air inlet to cause an inwardly flowing stream of air to move downwardly along a helical path from said filter head air inlet into said dirt receptacle, whereby dirt entrained in the air stream is directed toward the inner wall of the dirt receptacle, and means to move the fan end of said air conduit from the fan air inlet and into registry with the fan air outlet to expand the bag filter screen with a snap action acting to dislodge particles of dirt from the filter screen.

3. In a combined blower and vacuum cleaner, a dirt receptacle formed with an opening at its upper end, an inverted cup-shaped filter head detachably mounted upon and forming a cover for said dirt receptacle, said filter head being provided at its upper end with a tangentially disposed air inlet, said filter head being provided with an air outlet disposed adjacent the top center thereof, a filter frame mounted within said filter head, a flexible bag-type filter screen mounted over said filter frame and arranged to enclose the latter and to filter dirt from an air stream passing outwardly through said filter head air outlet, a centrifugal fan having an air inlet and an air outlet, an air conduit having its one end connected to said filter head air outlet and its other end in registry with the air inlet of said centrifugal fan, and a tubular filter bag guard mounted within said filter head to form therewith an annular passage leading downwardly from said filter head air inlet to cause an inwardly flowing stream of air to move downwardly along a helical path from said filter head air inlet into said dirt receptacle, whereby dirt entrained in the air stream is directed toward the inner wall of the dirt receptacle, and means to move the fan end of said air conduit from the fan air inlet and into registry with the fan air outlet to expand the bag filter screen with a snap action acting to dislodge particles of dirt from the filter screen, a flexible nozzle leading from said filter head air inlet, and an auxiliary filter bag for detachable engagement with the free end of said flexible nozzle.

4. In a combined blower and vacuum cleaner, a dirt receptacle formed with an opening at its upper end, an inverted cup-shaped filter head detachably mounted upon and forming a cover for said dirt receptacle, said filter head being provided at its upper end with a tangentially disposed air inlet, said filter head being provided with an air outlet disposed adjacent the top center thereof, a filter frame mounted within said filter head, a flexible bag-type filter screen mounted over said filter frame and arranged to enclose the latter and to filter dirt from an air stream passing outwardly through said filter head air outlet, a centrifugal fan having an air inlet and an air outlet, an air conduit having its one end connected to said filter head air outlet and its other end in registry with the air inlet of said centrifugal fan, and a tubular filter bag guard mounted within said filter head to form therewith an annular passage leading downwardly from said filter head air inlet to cause an inwardly flowing stream of air to move downwardly along a helical path from said filter head air inlet into said dirt receptacle, whereby dirt entrained in the air stream is directed toward the inner wall of the dirt receptacle, and a dirt deflector mounted adjacent the lower end of said tubular filter bag guard, said deflector being provided with radially disposed deflector blades disposed in a plane substantially normal to the direction of flow of a stream of air moving upwardly along a helical path into the lower end of said tubular filter bag guard to cause relatively heavy particles of dirt to be deflected downwardly into said dirt receptacle.

5. In a combined blower and vacuum cleaner, a dirt receptacle formed with an opening at its upper end, an inverted cup-shaped filter head detachably mounted upon and forming a cover for said dirt receptacle, said filter head being provided at its upper end with a tangentially disposed air inlet, said filter head being provided with an air outlet disposed adjacent the top center thereof, a filter frame mounted within said filter head, a flexible bag-type filter screen mounted over said filter frame and arranged to enclose the latter and to filter dirt from an air stream passing outwardly through said filter head air outlet, a centrifugal fan having an air inlet and an air outlet, an air conduit having its one end connected to said filter head air outlet and its other end in registry with the air inlet of said centrifugal fan, a tubular filter bag guard mounted within said filter head to form therewith an annular passage leading downwardly from said filter head air inlet to cause an inwardly flowing stream of air to move downwardly along a helical path from said filter head air inlet into said dirt receptacle, whereby dirt entrained in the air stream is directed toward the inner wall of the dirt receptacle, a dirt deflector mounted adjacent the lower end of said tubular filter bag guard, said deflector being provided with radially disposed deflector blades disposed in a plane substantially normal to the direction of flow of a stream of air moving upwardly along a helical path into the lower end of said tubular filter bag guard to cause relatively heavy particles of dirt to be deflected downwardly into said dirt receptacle, and manually operable means to move the fan end of said air conduit from the fan inlet and into registry with the fan outlet to expand the bag filter screen with a snap action acting to dislodge particles of dirt from the filter screen.

6. In a combined blower and vacuum cleaner, a dirt receptacle formed with an opening at its upper end, an inverted cup-shaped filter head detachably mounted upon and forming a cover for said dirt receptacle, said filter head being provided at its upper end with a tangentially disposed air inlet, said filter head being provided with an air outlet disposed adjacent the top center thereof, a filter frame mounted within said filter head, a flexible bag-type filter screen mounted over said filter frame and arranged to enclose the latter and to filter dirt from an air stream passing outwardly through said filter head air outlet, a centrifugal fan having an air inlet and an air outlet, an air conduit having its one end connected to said filter head air outlet and its other end in registry with the air inlet of said centrifugal fan, a tubular filter bag guard mounted within said filter head to form therewith an annular passage leading downwardly from said filter head air inlet to cause an inwardly flowing stream of air to move downwardly along a helical path from said filter head air inlet into said dirt receptacle, whereby dirt entrained in the air stream is directed toward the inner wall of the dirt receptacle, a dirt deflector mounted adjacent the lower end of said tubular filter bag guard, said deflector being provided with radially disposed deflector blades disposed in a plane substantially normal to the direction of flow of a stream of air moving upwardly along a helical path into the lower end of said tubular filter bag guard to cause relatively heavy particles of dirt to be deflected downwardly into said dirt receptacle, manually operable means to move the fan end of said air conduit from the fan inlet and into registry with the fan outlet to expand the bag filter screen with a snap action acting to dislodge particles of dirt from the filter screen, and means to hold said manually operable means in its selected position.

7. In a portable combined blower and vacuum cleaner, a filter head having an air inlet and an air outlet, a dirt receptacle connected to said filter head and having a passage leading thereto, a foraminous filter frame secured within said filter head, a bag type filter screen of flexible material secured within said filter head and said filter frame and enclosing the latter in normally loose substantially spaced relationship thereto and adapted to be extended against said screen and to filter an air stream passing outwardly through said filter head outlet and to be collapsed and spaced from said screen by a reversed air stream, a centrifugal fan having an air inlet and an air outlet, a flexible air conduit having one end connected to said filter head outlet, and means to move the other end of said flexible air conduit alternately into and out of registry with the air inlet and air outlet of said centrifugal fan.

CLARENCE W. LANTER.

REFERENCES CITED

The following references are of record in the file of this patent:

UNITED STATES PATENTS

| Number | Name | Date |
|---|---|---|
| 1,067,759 | Robertson | July 15, 1913 |
| 1,208,994 | Lion | Dec. 19, 1916 |
| 1,259,008 | Fraser | Mar. 12, 1918 |
| 1,507,010 | Sutton | Sept. 2, 1924 |
| 1,538,292 | Lindsay | May 19, 1925 |
| 1,719,174 | Eppler | July 2, 1929 |
| 1,868,519 | Breuer | July 26, 1932 |
| 2,031,454 | Bilde et al. | Feb. 18, 1936 |
| 2,193,784 | Smith | Mar. 12, 1940 |
| 2,380,382 | Baker | July 31, 1945 |
| 2,406,931 | Troxler | Sept. 3, 1946 |